Dec. 18, 1951     C. W. HANSEN     2,579,232
VEHICLE HITCH ASSEMBLY
Filed Jan. 2, 1948     3 Sheets-Sheet 1
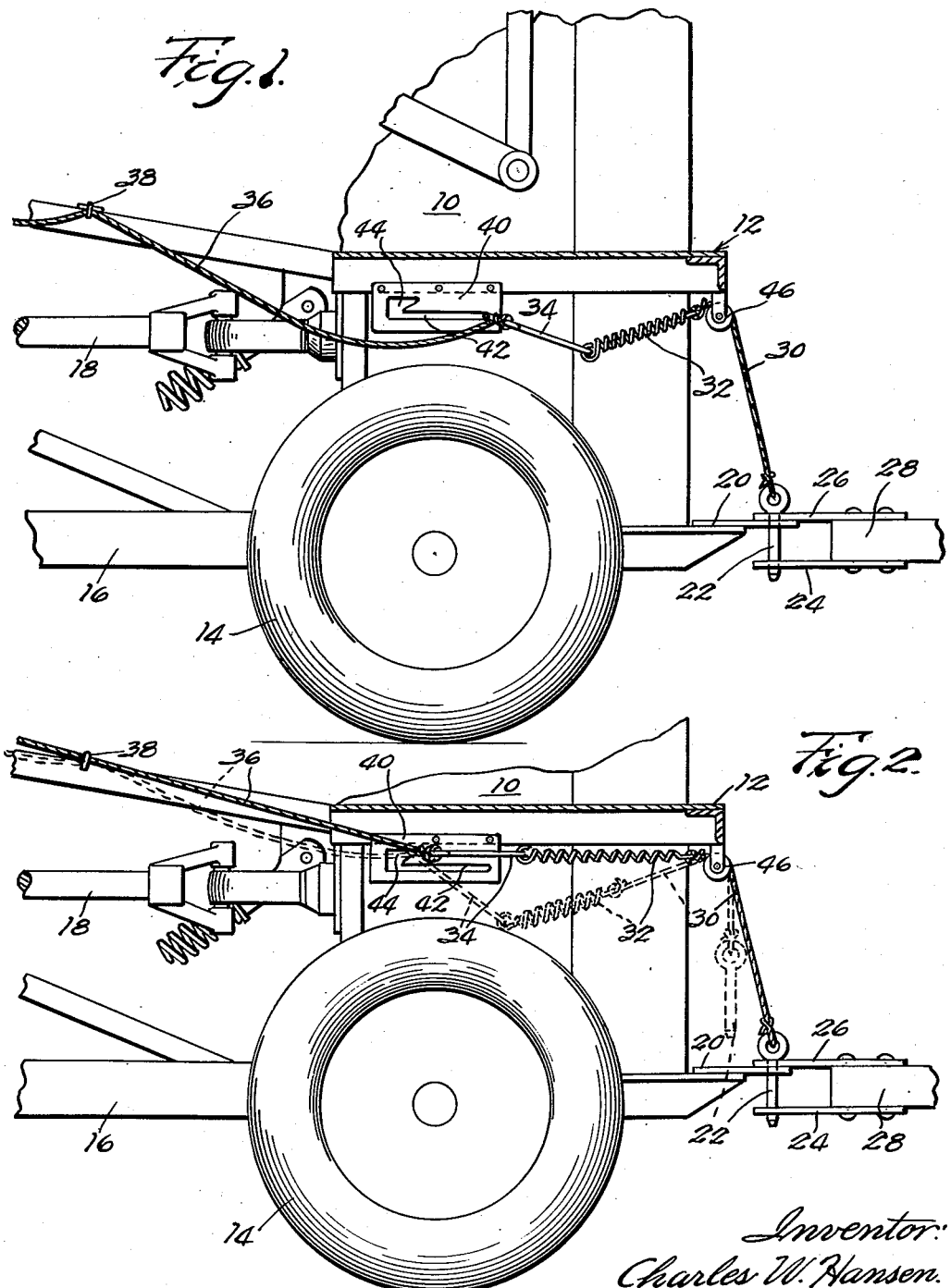

Dec. 18, 1951     C. W. HANSEN     2,579,232
VEHICLE HITCH ASSEMBLY
Filed Jan. 2, 1948     3 Sheets-Sheet 2
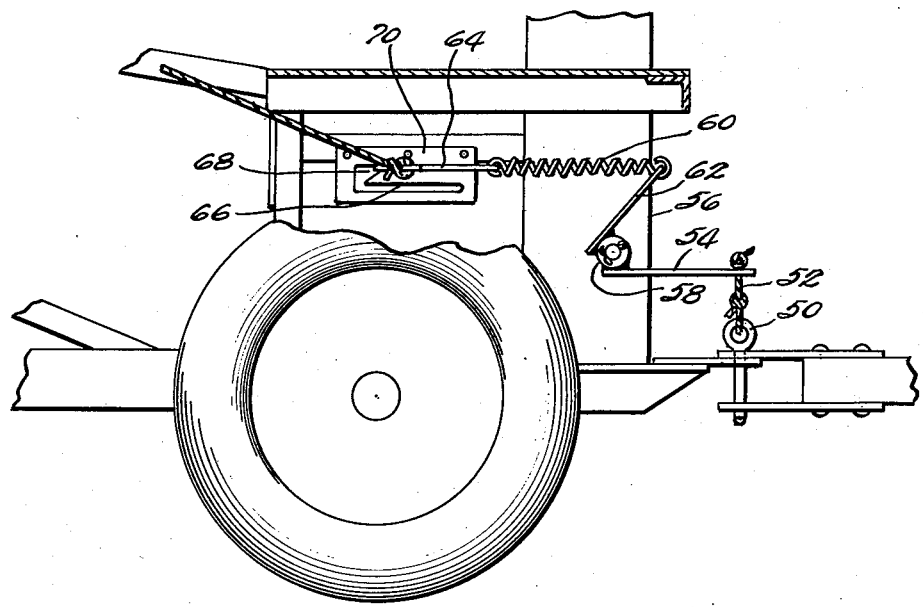
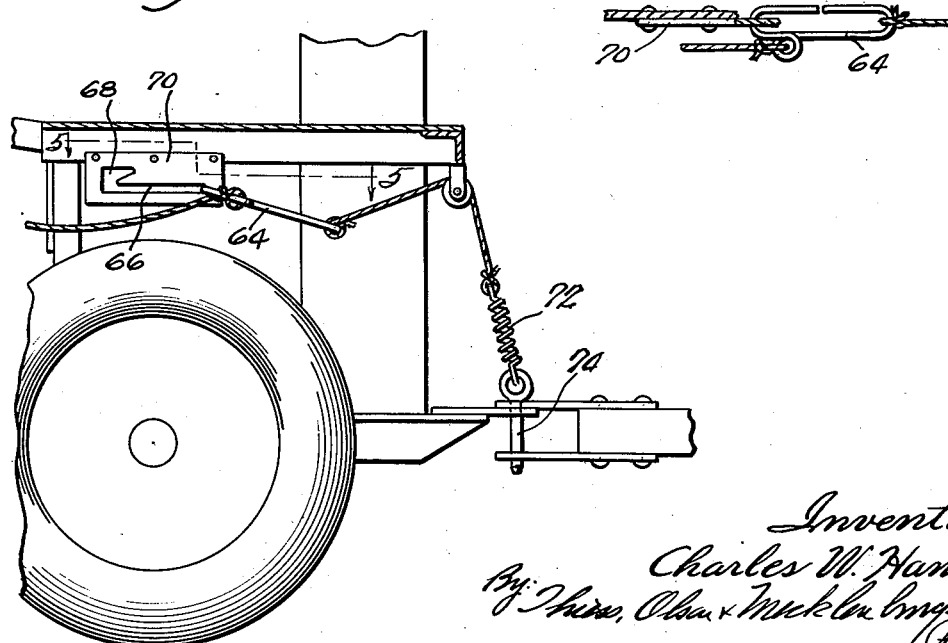

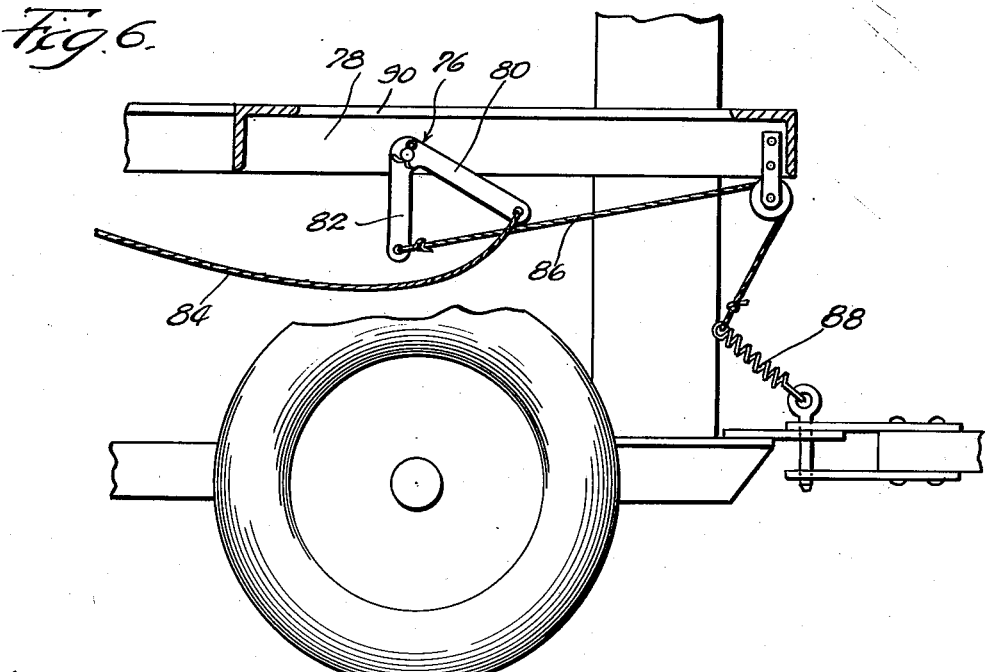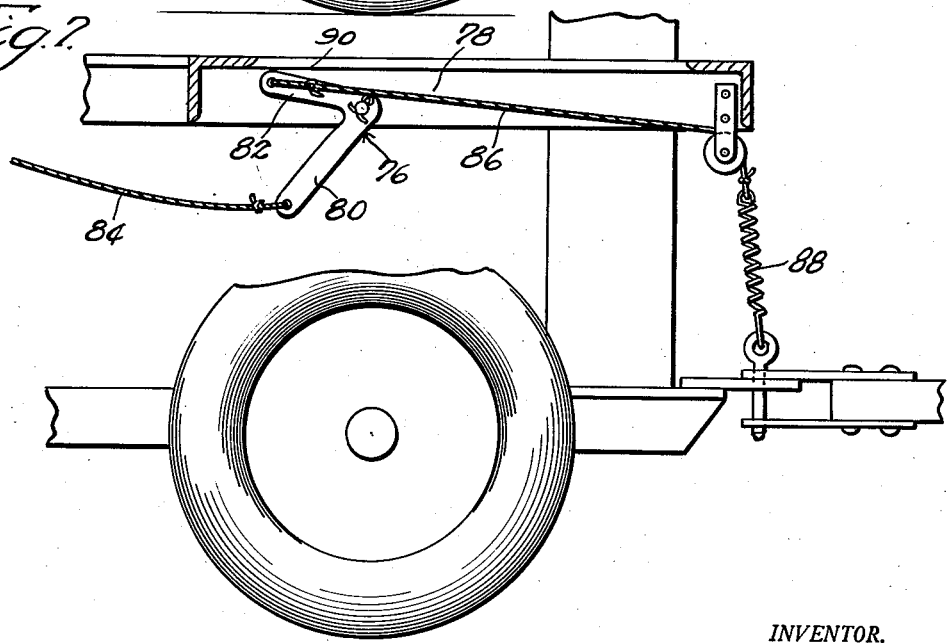

Patented Dec. 18, 1951

2,579,232

UNITED STATES PATENT OFFICE 2,579,232

VEHICLE HITCH ASSEMBLY

Charles W. Hansen, Racine, Wis., assignor to J. I. Case Company, Racine, Wis., a corporation of Wisconsin Application January 2, 1948, Serial No. 295

4 Claims. (Cl. 280—33.15)

This invention relates to a hitch and more particularly to a hitch which may be operated by remote control.

In the operation of certain types of farm machinery or implements, such as corn pickers field ensilage cutters and the like, there is generally provided means whereby a wagon or other conveyance may be drawn behind the implement in order to receive the harvested crop. Generally implements of this general character are pulled by a tractor operated by one man and when the wagon or other conveyance becomes filled, it has been necessary for the driver to stop the tractor, go to the rear of the implement, and attempt to unhitch the wagon by removing a clevis pin which attaches the wagon tongue to the drawbar of the implement. Usually a considerable amount of effort is required for the removal of the clevis pin because of the shearing forces or binding action exerted on the clevis pin of the hitch because the wagon either tends to pull away from the implement or run into it. Also considerable time may be lost in the operation of machinery of this general character if the driver is required to stop the tractor each time the wagon becomes full, dismount, proceed to the back of the implement and attempt to unhitch it. Accordingly, one object of this invention is the provision of a hitch which may readily be operated by remote control from the driver's seat of the associated tractor.

A further object of this invention is the provision of a simple form of hitch which may be adapted to various types of farm machinery which is simple, efficient and easily constructed.

A still further object of this invention is the provision of a hitch which may be conditioned for operation by a driver sitting at a remote point and which will automatically operate upon the cessation of any binding action or shearing force on the clevis pin employed in the hitch.

Further and additional objects will appear from the following description, the accompanying drawings and the appended claims.

In accordance with one embodiment of this invention, a hitch is provided for a vehicle which comprises an apertured hitch member, a clevis pin for insertion into the aperture of the hitch member and for cooperation with an aperture in a corresponding hitch member of another vehicle, a pull member secured to the pin and extending to a point remote from the hitch operable to tension the clevis pin toward withdrawal from the apertures, and a latch mechanism for temporarily holding the pull member in the pin-tensioning position. The pull member for the clevis pin may include a rigid loop member and the latch mechanism may include a plate having a notch and slot which serve as a guide for the loop member. Also the pull member has associated therewith a resilient spring means. Thus in operation of the device and while the vehicles are being drawn, the operator may exert force on the pull member, causing the spring means to extend and causing the loop member to progress along the slot of the plate and to become hooked in the notch provided. Thus tension is exerted on the clevis pin of the hitch but it will not be withdrawn because of the shearing force or binding action exerted thereon while one vehicle is pulling the other. However, due to the irregularities of the ground surface over which such vehicles are normally operated, there are intervals in which there is no binding action on the clevis pin and these ground irregularities will cause the rear vehicle or wagon to run toward the machine momentarily. This relaxes the binding action on the clevis pin and the resilient spring means on the pull member thereby withdraws the clevis pin, resulting in the unhitching of the vehicles. The wagon tongue then drops to the ground and normally the momentum of the wagon has been reduced to the point where no damage will be caused to the wagon tongue. The operator can then continue on his way with the tractor and implement preparatory to attaching another wagon for subsequent field operations.

For a more complete understanding of this invention, reference will now be had to the accompanying drawings, wherein:

Fig. 1 is an elevational view taken partially in section of the rear portion of a forage harvester hitched to a wagon tongue employing the hitch of this invention showing the hitch control in the relaxed condition;

Fig. 2 is similar to Fig. 1 except that it shows, in full lines, the hitch control in tensioned condition with the clevis pin in place and, in dotted lines, the hitch control with the clevis pin removed;

Fig. 3 is an elevational view taken partially in section of the rear portion of a forage harvester and attached wagon tongue illustrating a modified form of this invention;

Fig. 4 is also an elevational view taken partially in section showing a further form of this invention;

Fig. 5 is a sectional view taken along the line 5—5 of Fig. 4 showing the loop of the pull member in association with the latch mechanism.

Fig. 6 is an elevational view taken partially in section showing still another form of this invention wherein the harvester is attached to a wagon tongue and the hitch control is in the relaxed condition; and Fig. 7 is the same as Fig. 6 with the hitch control in the tensioned condition.

Referring now more particularly to Figs. 1 and 2, there is provided a farm implement such as a forage harvester 10 having a frame member 12 and suitable wheels 14. The forward end of the implement (not shown) is attached to a tractor (not shown) through a suitable frame bar 16; and a drive shaft 18, also connected to the tractor, is provided for driving the various mechanisms (not shown) associated with the implement. Adjacent the rear portion of the harvester there is provided an apertured plate 20 welded or otherwise secured to the frame bar 16. The aperture in this plate is adapted to receive a clevis pin 22 whereby the wagon or other vehicle (not shown) is hitched to the implement through registering apertures in a pair of plates 24 and 26 secured to the end of wagon tongue 28.

In order to effect the removal of the clevis pin 22 from the vertically aligned apertures in the plates 20, 24 and 26, there is provided a pull member which includes a line 30, a coil spring 32, a rigid loop member 34 and a line 36. The line 36 extends forwardly and upwardly through a guide member 38 toward the operator's seat (not shown) of the tractor. As shown in the drawing, a plate member 40 is bolted or otherwise secured to the frame 12. The plate member is positioned vertically and is provided with a forwardly extending slot 42 which serves as a guide or track for the loop member 34 which is looped therethrough, as most clearly shown in Fig. 5. A notch 44 extending upwardly and rearwardly is provided in a forward end of the plate 40 and communicates with the slot 42 thereby providing means for holding the loop member 34 in a forward position. The line 30 is also supported on the frame 12 by means of a pulley 46 secured to the frame at a point spaced above the clevis pin 22.

It will thus be seen in the normal operation of the two vehicles represented by the harvester 10 and the wagon having a tongue 28 that these vehicles are retained hitched by the clevis pin 22 inserted through the registering apertures of the plates 20, 24 and 26, the pin being held in position by force of gravity. This normal condition of operation is particularly shown in Fig. 1 in which the pull member is shown in the relaxed condition with the loop 34 being positioned adjacent the rear end of the slot 42 in plate 40. However, when the tractor operator wishes to unhitch the wagon from the implement, he then pulls line 36 causing the loop member 34 to travel forwardly within the slot 42 to a front portion thereof and thereby tensioning spring 32. Inasmuch as the guide 38 is vertically, as well as forwardly, spaced from the slot 42, the loop member 34 has a tendency to ride on the upper surface of the slot 42 into the notch 44. At this point the operator may then relax his hold on the line 36 and the hitch control assumes the position shown in the full lines of Fig. 2, with the spring 32 being tensioned to lift the clevis pin 22 from the apertures in the hitch member. The tractor operator at this point can then direct his entire attention to the operation of the tractor and implement and know that no further attention to the hitch is required, the clevis pin 22 being held against removal by the binding action or shearing forces exerted through the apertures of the hitch plates 20, 24 and 26 of the two vehicles.

However, when the operator wishes the wagon to become unhitched from the implement, he merely slows down the tractor whereby, partly due to the unevenness of the ground, the wagon will have a tendency to roll toward the implement, thus momentarily relaxing the shearing forces exerted on the clevis pin. At this moment the spring 32 then operates to withdraw the clevis pin 22 from the apertures 20, 24 and 26, thereby unhitching the wagon from the implement. This condition of pin removal is shown in the dotted lines of Fig. 2. The operator may then proceed with the tractor and implement to another point in the field, hitch on another wagon, and continue his operations.

In accordance with another modification of this invention, the pull member may have a spring-tensioned bell crank mechanism associated therewith for withdrawing the clevis pin. The operation of this modification is similar to that disclosed above and is more particularly shown in Fig. 3. In this embodiment, clevis pin 50 is secured by means of a line 52 to one arm 54 of a bell crank which is pivoted to the frame 56 of a forage harvester at point 58. A spring 60 is secured to an end of the other arm 62 of the bell crank and to a rigid loop member 64 which is similar to that previously described and to that shown in Fig. 5. The loop member 64 rides within a slot 66 and a notch 68 of plate 70 in the same manner previously indicated. It will be noted that the arm 54 of the bell crank is arranged to pull the clevis pin 50 vertically from the hitch members when the hitch is operated. It will be understood that Fig. 3 depicts a bell crank modification wherein the hitch control has been conditioned for operation by the operator of the tractor and the clevis pin 50 is tensioned for withdrawal by the spring 60. It will also be noted that both arms 54 and 62 of the bell crank extend generally rearwardly of the pivot point 58 so that, unless spring 60 is tensioned, the bell crank has a tendency to fall by gravity toward the clevis pin, thus acting against withdrawal of the clevis pin.

Fig. 4 discloses still another modification of this invention which is similar to that disclosed in Figs. 1 and 2 except that tensioning spring 72 is secured directly to clevis pin 74 instead of between the pulley member and the loop member as specifically disclosed in Figs. 1 and 2. In this modification also means is provided for substantially vertical withdrawal of the clevis pin 74 from the hitch members.

While Fig. 5 is a sectional view taken along the line 5—5 of Fig. 4, it will be understood that the loop member there shown is the same as that employed with the hitches disclosed in Figs. 1, 2 and 3. Fig. 5 clearly shows that this loop member comprises a closed loop which rides within the slot and notch of the vertical plate, thus providing a latch for tensioning the clevis pin at the will of the operator.

Still another modification of this invention is disclosed in Figs. 6 and 7. In this embodiment the latch mechanism for the pull member takes the form of a bell crank 76 pivoted to frame member 78 and includes a pair of normally depending arms 80 and 82. A line 84 is secured to the end of the rearwardly depending arm 80 and extends to the operator's seat (not shown) and a line 86 is secured to the end of the forwardly depending arm 82 and extends to the hitch. Spring 88 serves to hold the hitch control in spring tensioned condition for the purposes previously indicated. Thus when the operator pulls line 84 the bell crank 76 pivots in a clockwise direction resulting in the tensioning of spring 88. As will be clear from Fig. 7, the bell crank will be held in spring tensioning position by reason of the arm 82 abutting horizontal flange 90 integral with frame member 78 and by reason of the end of the arm 82 and line 86 being over center with respect to the pivot point of the bell crank 76.

It will thus be seen that a simple and effective remote control hitch has been provided which is useful for unhitching farm vehicles in field work. This device is particularly useful in field corn harvesters because of the short intervals of time required to fill the wagon. The wagon may readily be unhitched at the will of the operator and with a minimum amount of attention on his part, whereby considerable time and effort is saved in the harvesting process.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

I claim:

1. A hitch for a vehicle having a frame which comprises an apertured hitch member, a clevis pin for insertion into said hitch member, a pull member secured to said clevis pin for withdrawal thereof from said hitch member extending to a point remote from said hitch member, a loop member forming a part of said pull member, a plate secured to said frame having a slot and holding notch providing a track receiving said loop member, and a member including a resilient element also forming a part of said pull member operatively positioned between said clevis pin and said loop member, said pull member being relaxed when said loop is received in said slot and tensioned to clevis pin withdrawing condition when received in the said notch.

2. A hitch for a vehicle having a frame which comprises a plate mounted on said frame having a forwardly extending slot and a notch extending upwardly and rearwardly from a forward portion of said slot, a loop member guided by said slot and notch, a clevis pin, a member containing a resilient element operatively connecting said clevis pin and said loop member whereby said loop when received in said notch is tensioned to clevis pin withdrawing position, and a pull member secured to said loop member and extending forwardly thereof for positioning said loop member in said notch.

3. A hitch for a vehicle having a frame which comprises a substantially vertical plate mounted on said frame forwardly of the rear end thereof, said plate having a forwardly extending slot and a notch extending upwardly and rearwardly from a forward portion of said slot, a loop member embracing said slot and guided thereby in forward motion thereof, a pull member secured to said loop member and extending forwardly and upwardly of said slot and notch, a hitch member, and a pull element including a spring extending rearwardly and downwardly connecting said loop member and said hitch member for tensioning said hitch member to an inoperative position when said loop is retained within said notch.

4. The hitch recited in claim 3 wherein said hitch member includes a clevis pin and wherein said pull element comprises a line and coiled spring supported on said frame at a point spaced above said clevis pin.

CHARLES W. HANSEN.

REFERENCES CITED

The following references are of record in the file of this patent:

UNITED STATES PATENTS

| Number | Name | Date |
|--------|------|------|
| 270,057 | Haines et al. | Jan. 2, 1883 |
| 295,985 | Crocker | Apr. 1, 1884 |
| 362,253 | Davis | May 3, 1887 |
| 1,600,449 | Ahlborn | Sept. 21, 1926 |
| 1,649,980 | Schlagenhauf | Nov. 22, 1927 |